June 13, 1972 W. D. MILLS 3,669,627
METHOD AND APPARATUS FOR DETERMINING THE COMPOSITION OF
A HYDROCARBON-CONTAINING FUEL MIXTURE
Filed March 5, 1970 3 Sheets-Sheet 1
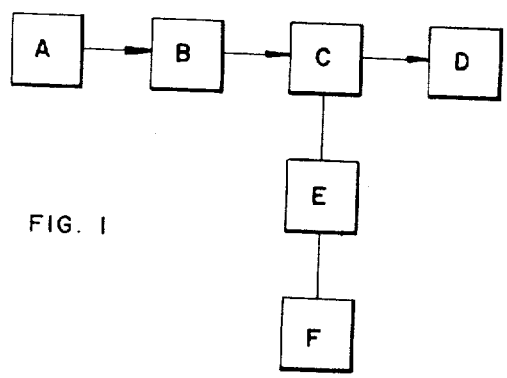
FIG. 1
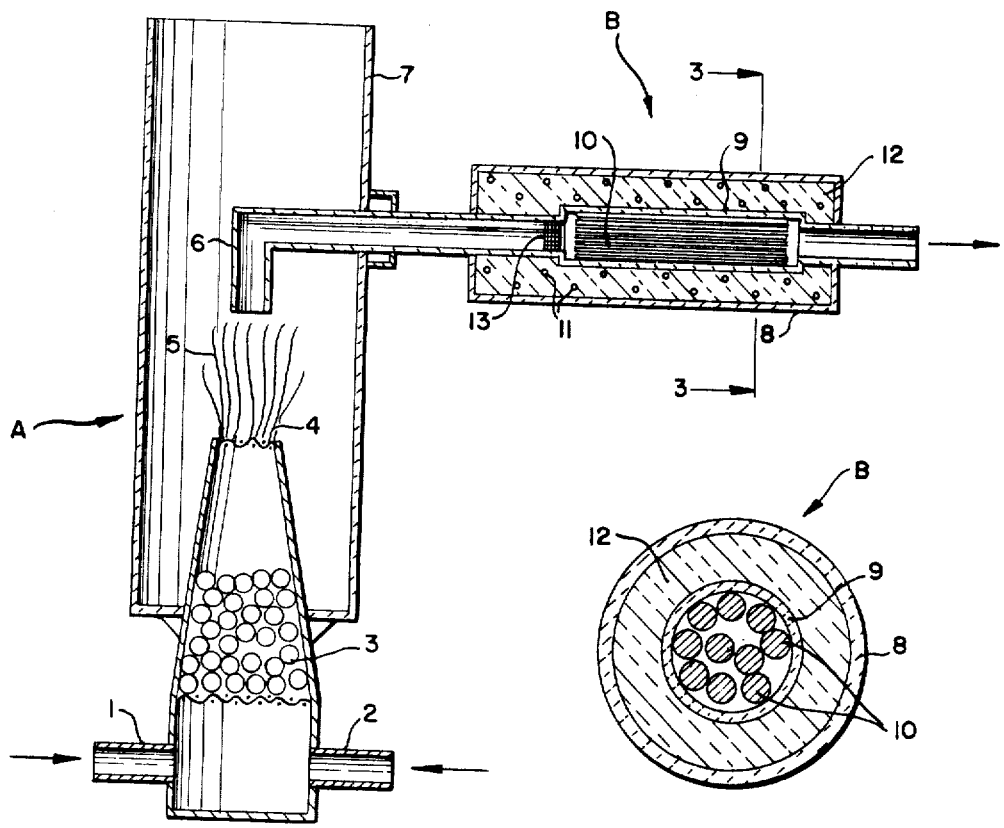
FIG. 2
FIG. 3
INVENTOR:
WALTER D. MILLS
BY: Louis J. Bovasso
HIS ATTORNEY INVENTOR:
WALTER D. MILLS
BY: *Louis J Bovasso*

HIS ATTORNEY

INVENTOR:
WALTER D. MILLS

United States Patent Office 3,669,627
Patented June 13, 1972

3,669,627
METHOD AND APPARATUS FOR DETERMINING THE COMPOSITION OF A HYDROCARBON-CONTAINING FUEL MIXTURE
Walter D. Mills, Mold, Wales, assignor to Shell Oil Company, New York, N.Y.
Filed Mar. 5, 1970, Ser. No. 16,786
Claims priority, application Great Britain, Mar. 10, 1969, 12,382/69
Int. Cl. G01n *31/12*
U.S. Cl. 23—230 PC                                    9 Claims

ABSTRACT OF THE DISCLOSURE

Apparatus and method for determining the composition of a hydrocarbon-containing fuel mixture by oxidizing a sample of the mixture to completion and determining the dielectric constant of the fully oxidized material.

BACKGROUND OF THE INVENTION

Field of the invention

This invention relates to the analysis of compositions comprising hydrocarbon materials and particularly to the analysis of combustible mixtures.

Description of the prior art

The efficient utilization of hydrocarbon fuels, involving as it does as complete oxidation as possible of the carbonaceous material, is of importance inter alia because the fuel itself is expensive and its waste is therefore uneconomic.

Combustion systems, whether of the sophisticated explosion type as exemplified by the internal combustion engine, or the simple fuel burning furnace, are constantly being improved in an attempt to increase the efficiency of combustion and to reduce the emission of unburnt hydrocarbon to the atmosphere. The efficient combustion of a fuel material, that is, combustion with optimum energy output, may be related not only to the nature of the fuel being burnt, but also, for example, to the shape of the combustion chamber, ignition timing if used, and the ratio of fuel to oxidizing material (usually air) in the combustion chamber. This last factor is particularly difficult to determine accurately, and yet it is most important that this information should be available so that, for example, the effect on efficiency of any modifications to, say, the combustion chamber or ignition timing may correctly be assessed. The combustion characteristics of any internal combustion engine in a motor car, for instance, can vary very rapidly and between wide limits. Thus, cold starting (often with an enriched fuel mixture), acceleration, idling, fast cruising and braking all present their characteristic combustion pictures, and it is sometimes desirable to have a substantially continuous analysis of the fuel mixture undergoing combustion under these transient conditions so that the effect of any changes in its composition can be ascertained and related to variations in combustion conditions.

SUMMARY OF THE INVENTION

It has been found that the combustion of the fuel mixture (usually this is a mixture of hydrocarbon material and air, although other oxidizing materials, for example, pure oxygen, may be employed) may be determined by taking a sample of the fuel mixture, oxidizing the oxidizable component to completion (i.e., until all carbonaceous material is in the form of $CO_2$) and determining the ratio of the components of the mixture of combustion products by measuring the dielectric constant of the gas mixture.

According to one aspect of the invention, therefore, there is provided a method of determining the composition of a hydrocarbon containing fuel mixture which comprises taking a sample of the fuel mixture, oxidizing the oxidizable components in said fuel mixture to completion and measuring the dielectric constant of the mixture of gaseous combustion products.

One way of carrying out the invention is actually to sample the fuel mixture immediately before combustion occurs, but this procedure has disadvantages in that it is inconvenient to take frequent samples from, say, the cylinder of an internal combustion engine, and the very fact of sampling the mixture may introduce a further factor which could affect combustion performance. Of course, in many cases, as in the case of a stationary gas burner, direct sampling of the fuel mixture may be satisfactory, but we have found it advantageous, particularly in the case of an internal combustion engine, to perform the oxidation in two stages, the first stage being the actual combustion of the fuel in the engine in the conventional ignition phase and the second a supplementary oxidation stage in which any unoxidized carbonaceous material in the exhaust gas is oxidized to completion, the composition of the final mixture of fully oxidized gases being determined as described by measurement of the dielectric constant.

According to another aspect of the invention, therefore, there is provided a method of determining the composition of a fuel mixture which comprises effecting combustion of the mixture, oxidizing a sample of the exhaust gas to ensure complete oxidation of oxidizable material, and subsequently measuring the dielectric constant of the fully oxidized gaseous mixture.

Oxidation of the material under investigation, whether unburnt fuel mixture or the exhaust from the combustion chamber, may be by any convenient means, although it is of course essential that if sequential determinations of the fuel composition are to be made, mixing of the gas as it undergoes oxidation must be kept to a minimum, and particularly an essentially laminar flow of gas through the oxidizing unit is desirable. For this reason, it is preferred to effect oxidation as the mixture passes through one or more tubes, the tubes being of dimensions such that turbulence of the material passing therethrough is minimal. Alternatively, although not so conveniently, batchwise oxidation and subsequent analysis may be employed, a given volume of material being delivered into a suitable container in which oxidation is effected, after which the fully oxidized material is discharged from the oxidizing unit into a suitable cell for measurement of the dielectric constant. It is, of course, essential that oxidation, and indeed all operations between sampling of the material to be analyzed and the determination of its dielectric constant, are carried out under conditions such that contamination of the specimens with extraneous gases does not occur.

Oxidation may be brought about by any suitable oxidizing agent and we have found cupric oxide to be particularly effective. Thus, in one embodiment of the invention, promoted oxidation of incompletely oxidized exhaust gas has been promoted by contacting it with hot cupric oxide. Cupric oxide is the preferred oxidizing agent but others which may be used include, for example, the oxides of tin, iron and nickel. It will usually be necessary to heat the oxidizing agent to a suitably high temperature at which oxidation will proceed at a sufficiently rapid rate to be useful; a temperature of above about 400° C. is usually satisfactory but a temperature between about 600° C. and 800° C. is preferred.

We have employed cupric oxide in the form of rods packed together, side by side, inside a tubular container to form a series of tubes or channels bounded by the rods, along which the material to be oxidized is passed. Alternatively, plates or tubes lined with the oxidizing agent may be employed. Devices for ensuring intimate contact of materials undergoing chemical reaction are well known and present no difficulty to those skilled in the art.

The oxidizing agent may be heated electrically, for example, by suitably disposed electrical heating elements; the use of heating coils disposed around the oxidizing unit is particularly convenient. Where the material being oxidized is an exhaust gas, there may be some heating effect from the gas itself. It may also be possible to use hot exhaust gases to contribute to the heating of the oxidizing agent, for example, by circulating the hot gas around the oxidizing unit, a small proportion of the gas only being passed through the oxidizing unit and on for analysis.

Measurement of the dielectric constant of the fully oxidized material after it leaves the oxidizing unit may be made in any suitable known fashion, for example, using a commercially available capacitance cell. However, because the sample to be examined is likely to be at a high temperature following oxidation (although, of course, provision may be made for it to be cooled to a suitably low temperature before its dielectric constant is determined) and because it is important to avoid errors due to minor variations in temperature causing distortion of the capacitance cell due to thermal effects, equipment should be employed in which thermal distortion of the cell is unlikely to occur. Cells which are particularly resistant to thermal distortion are preferred.

When a series of measurements of the dielectric constant is required, and particularly at short intervals of time, it is important that the cell employed should be one which can be rapidly swept clean of gas which has been analyzed, before a new sample is fed into it, so that mixing is avoided.

Laminar flow through the cell is therefore preferred, and it has been found to be particularly advantageous to ensure that the swept volume of the cell and the distance between the plates is kept to a minimum, consistent with effective operation. For example, it has been found that a cell having a plate gap of $5/1000''$ gives good results in that sweeping of the cell is rapid and laminar flow is maintained. There may occur, in some instances, deposition of solid material from the gas under test, which can effect the accuracy of the cell. In practice therefore, it has been found to be more suitable to employ a plate separation of about $1/100''$.

BRIEF DESCRIPTION OF THE DRAWING

FIG. 1 is a schematic illustration of a preferred method for carrying out the teachings of my invention;

FIG. 2 is a vertical sectional view of preferred apparatus for carrying out the method of FIG. 1;

FIG. 3 is a sectional view taken along the line 3—3 of FIG. 2;

DESCRIPTION OF THE PREFERRED EMBODIMENT

Figure 4:
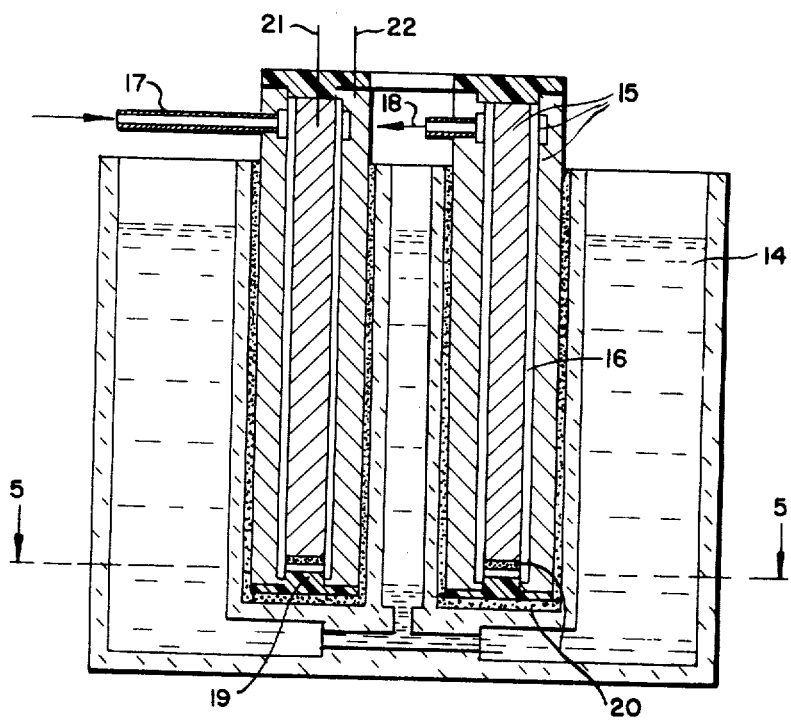
FIG. 4 is a vertical sectional view of a portion of apparatus for carrying out the method of FIG. 1.

Referring now to the drawing, FIG. 1 shows the flow of a hydrocarbon-containing material from a source A, such as the exhaust of an internal combustion engine, through an oxidizing unit B, and then through a capacitance cell C. The gas is drawn through the system by a pump D. The differences in dielectric constant of the gases passing through the cell are monitored using the transfer ratio-arm bridge E, and displayed as a trace on the chart of the recorder F, relative to an arbitrary level.

In order to exemplify the mode of operation and the performance of the present system, an experiment was carried out wherein the air/fuel ratios of ethylene-air flames of varying known compositions were determined using controlled conditions and the system of the present invention. The experiment was carried out as follows.

Apparauts was set up generally as shown in FIG. 1, A being represented by a burner (shown in FIG. 2); B is represented by an electric furnace packed with rods of cupric oxide (shown in FIGS. 2 and 3); and C is a capacitance cell (shown in FIG. 4). Controlled, measured amounts of ethylene and air were fed into the burner where they were intimately mixed before being burnt.

Referring now to FIG. 2, inlets 1 and 2 are shown for introducing measured quantities of ethylene and air respectively into burner A; glass beads are packed in area 3 to promote intimate mixing of the fuel and air before it passes through the wire gauze 4 to burn in the flame zone 5. A small diameter sampling probe-tube 6 is placed just above the flame zone 5 to collect representative samples of the combustion products. The whole assembly is surrounded by a protective glass screen 7 which enables the flame to be observed but which does not allow any extraneous air or other material to interfere with the combustion reaction.

The combustion products from the flame zone 5 enter sampling tube 6 and pass through a filter plug 13 (to remove solid particles), preferably of fiberglass, and into the oxidation unit B (FIG. 3) which consists of a tubular compartment 9, preferably of Pyrex, a borosilicate glass manufactured by Corning Glass Works, and packed with rods of cupric oxide 10. The inner compartment is enclosed within an envelope of an electrical insulating material 12, such as ceramic, in which is embedded an electrical heating coil 11 (FIG. 2). The entire unit B is enclosed within an outer container 8, preferably of Pyrex.

The cupric oxide is heated, by means of the heating coil 11, to a temperature of about 600° C., at which temperature any unoxidized carbonaceous material in the exhaust gas is oxidized to $CO_2$ and water.

Figure 5:
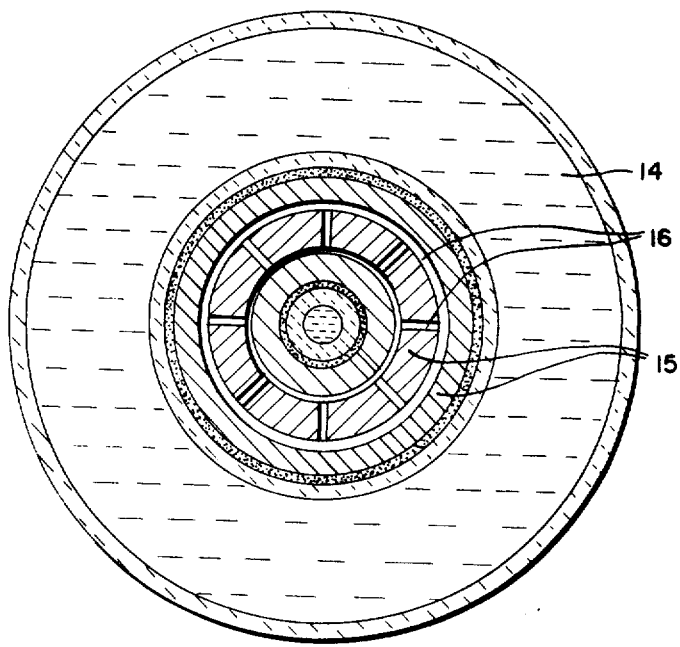
FIG. 5 is a sectional view taken along the lines 5—5 of FIG. 4.

The fully oxidized mixture of gases is then passed from outlet 17 (FIG. 3) through a capacitance cell C (FIGS. 4 and 5). A constant temperature bath 14 is shown in FIGS. 4 and 5 comprised of boiling chlorobenzene (Boiling Point 130° C.). A capacitance cell 15 is disposed in bath 14 in which the gap 16 between the plates is in the form shown, the gas entering the cell at outlet 17 and leaving at outlet 18. The cell 15 is supported by an insulating plug 19 and is separated from the constant temperature bath 14 by a packing of copper powder 20, which helps maintain heat contact. Changes in capacitance are detected via leads 21 and 22.

Maintenance of the water in the vapor state is by heating all passages through which it passes to a temperature above 110° C. and preferably to a temperature similar to that at which the dielectric constant will be determined.

Figure 6:
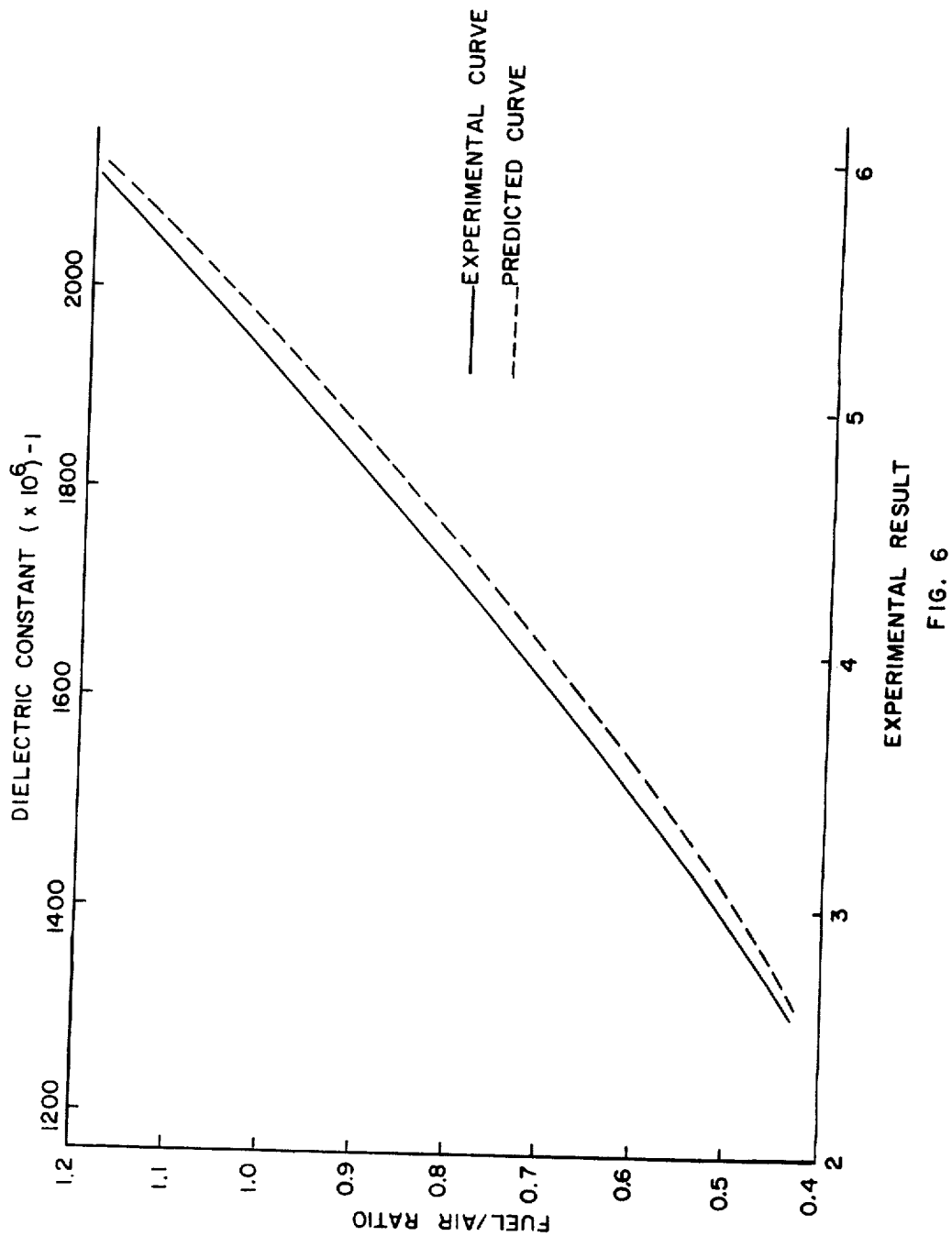
FIG. 6 is a graphical illustration of the techniques of my invention.

FIG. 6 is a graph on which are plotted air/fuel ratios against a theoretical dielectric constant value and also against the recorder displacement when using the capacitance cell. The recorder must, of course, be calibrated against a standard, but the general correspondence of the curves indicates the accuracy of response of the instrument.

The chemical composition of the combustion products of a hydrocarbon/air or hydrocarbon/oxygen mixture is known and given the dielectric constants of the various gases which constitute the mixture of combustion products, the composition of the mixture may be computed from the experimentally determined dielectric constant.

For comparison purposes, to ensure that variation in, say, the temperature of the cell does not influence the accuracy of the analysis, it is possible to employ, in the same temperature bath, a second capacitance cell measuring, simultaneously, the dielectric constant of a standard gas.

It may also be advantageous, when an excess of oxygen may be present in the exhaust such as at certain periods in the "lean" running of an internal combustion engine, to remove this by contacting it with copper heated to a temperature sufficiently high to react with the oxygen before the dielectric constant of the mixture is determined. This may be carried out in apparatus essentially similar to that used for the oxidizing units, but packed, for example, with rods of metallic copper.

I claim as my invention:

1. A method of determining the composition of a hydrocarbon-containing fuel mixture which comprises the steps of:
   oxidizing a sample of the hydrocarbon-containing fuel mixture to completion; and
   determining the dielectric constant of the fully oxidized material, said dielectric constant determination being a measure of the fuel to air ratio of said hydrocarbon-containing fuel mixture.

2. The method of claim 1 in which the step of oxidation is carried out by contacting the fuel mixture with an oxidizing agent which is a metal oxide.

3. The method of claim 2 including the step of heating the metal oxide to a temperature above 400° C.

4. The method according to claim 1 in which the step of oxidation is carried out in two separate stages and the second oxidation stage comprises the step of contacting the partly oxidized fuel mixture with an oxidizing agent which is a metal oxide.

5. The method of claim 4 in which the first oxidation stage is carried out by combustion of the fuel mixture in an internal combustion engine.

6. Apparatus for determining the composition of a hydrocarbon-containing fuel mixture comprising:
   oxidizing means adapted to carry out oxidation of a hydrocarbon-containing mixture to completion; and
   measuring means operatively engaging said oxidizing means for determining the dielectric constant of the fully oxidized gas.

7. The apparatus of claim 6 including temperature control means operatively engaging said oxidizing means for maintaining the temperature of the gas under examination above the boiling point of water.

8. The apparatus of claim 6 wherein the oxidizing means comprises a container, heating means coupled to said container to heat said container; and
   an oxidizing agent disposed in said container such that on passage of the mixture through the container said mixture contact the oxidizing agent.

9. The apparatus of claim 8 in which the oxidizing agent is in the form of cupric oxide rods.

References Cited

UNITED STATES PATENTS

| 2,083,520 | 6/1937 | Miller | 23—232 |
| 3,424,977 | 1/1969 | Krobath | 324—61 |

OTHER REFERENCES

Murdock et al., Anal. Chem. 20, No. 1, January 1948, pp. 65–67.

MORRIS O. WOLK, Primary Examiner

R. M. REESE, Assistant Examiner

U.S. Cl. X.R.

23—253 PC; 324—61 R